United States Patent Office 3,459,591
Patented Aug. 5, 1969

3,459,591
PROCESS FOR COATING POLYOLEFINIC FILMS TO MAKE THEM HEAT-SEALABLE AND GAS AND WATER-VAPOR IMPERMEABLE
Hikoichi Konishi and Yuichi Harada, Amagasaki-shi, and Tamotsu Sunahara, Osaka, Yasuhiro Sakaguchi, Sakai-shi, and Tetsuo Ishihara, Itami-shi, Japan, assignors to Daicel Ltd., Osaka, Japan, a corporation of Japan
No Drawing. Filed Nov. 16, 1965, Ser. No. 508,136
Claims priority, application Japan, Nov. 17, 1964, 39/64,687
Int. Cl. B44d 1/22; C08d 13/24
U.S. Cl. 117—138.8      2 Claims

ABSTRACT OF THE DISCLOSURE

A process for the production of a heat-sealable, gas and water-vapor impermeable polyolefinic film which comprises applying a coating on at least one surface of the film, the coating composition consisting essentially of a homopolymer or copolymer of vinylidene chloride, vinyl chloride or ethylene-vinyl acetate copolymers together with a lesser amount of a chlorinated or chlorosulfonated polyolefin having a crystalline structure.

---

The present invention relates to a process for coating a polyolefinic plastic film comprising a polyolefinic polymer, a polyolefinic copolymer, or mixtures thereof in order to improve the heat sealability, the impermeability to gases, vapors and oils and the printability of the coated film.

The process of this invention is applicable to polyolefinic plastic films which are made of a polymer or a copolymer of ethylenes including low-density, middle-density, and high-density polyethylenes; a crystalline polymer or copolymer of α-olefins having 3 to 6 carbon atoms; mixtures of the above-mentioned polyolefins; and mixtures of one or more of the above-mentioned polyolefins and another polymer other than a polyolefin, such as, polyamides, polyacrylic esters, epoxy resins, and polyurethanes. The various properties that have been weak points in the use of conventional polyolefin packaging films, such as heat sealability, impermeability, printability, and mechanical properties are improved in polyolefinic plastic films treated according to the process of this invention.

As is well known, films produced from crystalline polyolefins, such as polyethylene and polypropylene, have excellent physical and chemical properties which make them useful as packaging films, but they also have various unsatisfactory properties in practical use.

For example, in practicing heat sealing of films made of low-density polyethylene or medium-density polyethylene, the softening point of low-density polyethylene or medium-density polyethylene is far lower than the temperatures needed to effect heat sealing of the film. In the case of polypropylene films, the temperatures at which heat sealing of the film can be effected are high and the heat-sealing temperature range is very narrow. Thus, heat sealing of such films is difficult.

Also, as is well known, these films are transparent or translucent and have an excellent water-proofing property, but they are inferior in their impermeability properties, that is to say, in such properties as minimizing gas permeability, penetration of oils and transmission of odor.

Moreover, since polyolefins are composed of, in chemical structure, only high molecular weight hydrocarbons and have no polar groups in the molecule, the adhesion of printing inks thereto is unsatisfactory and, hence, good printed surfaces cannot be formed on untreated polyolefin films.

Therefore, various improvements in packaging techniques for polyolefinic films have hitherto been made, such as improvements in the properties of film, the packaging machines and the packaging methods. For example, since in carrying out heat sealing of a polyolefinic film it is impossible to use a conventional heat sealer of the type that has been used for heat sealing the usual heat-sealable, moisture-proof regenerated cellulose (or MST cellophane) films, a special sealer must be used. However, although sufficient bonding can be obtained by using such a special sealer, the appearance of the sealed portion is liable to become unsightly due to the deformation of the bonded portion and pin holes are formed at the bonded portion by the heat-sealing operation, which pin holes reduce the barrier power of the film.

Further, in order to improve the adhesive property of polyolefin films for printing inks, it has been suggested to carry out a surface treatment of the film by corona discharge or flame or by applying a chemical surface treatment, but the thus obtained adhesive property is not always satisfactory and printing inks deposited on thus treated surface are easily removed by a peeling test using "Scotch" tape.

Therefore, in order to improve these various faults, it has been suggested to coat the surface of such a film with a special coating polymer suitable for each desired purpose as in the case of treating regenerated cellulose films. For example, in order to obtain a heat-sealing property, a vinyl chloride copolymer, an ethylene-vinyl acetate copolymer, a vinyl acetate-crotonic acid copolymer and the like are mainly used as such coating polymers and in order to obtain impermeability to gases, vapors or oils, a vinylidene chloride copolymer and the like are used. Further, in order to endow printability to the film surface, a polymer having an affinity to printing inks is used and also a physical or chemical treatment is used to simply oxidize the surface of the film.

Coating of films with a polymer composition is generally carried out by an immersion system, by various roll coating systems, or by a spraying system using the polymer composition in a form of an emulsion, a solvent solution or a melt. But, in any case of applying such a coating system to polyolefinic films, owing to the nonpolarity of the polyolefinic films, it has been conventional that some pretreatment of the film base to be coated is carried out prior to coating the film base with the coating composition in order to improve the adhesive property of the film surface.

We have found that improvements in each or all of the adhesive property, impermeability property and printability property of polyolefinic films can be effected by using a coating polymer composition comprising (A) one or more polymers selected from the group consisting of polymers and copolymers of vinylidene chloride, vinyl chloride copolymers, ethylene-vinyl acetate copolymers, and vinyl acetate copolymers and (B) a chlorinated polyolefin or a chlorosulfonated polyolefin having a good miscibility with the above-mentioned polymer or copolymer. Coating of the polymer so that a good bond is formed can be carried out by directly applying the coating composition on a polyolefin film base, that is, by a so-called single-step treatment without any necessity for carrying out the above-mentioned pretreatment procedures which have been an indispensable factor in conventional coating methods for polyolefinic films. According to the process of this invention, the troubles caused by the pretreatment procedures, such as the reduction of the transparency of film or so-called blushing, can be eliminated and transparent coated films having good qualities can be produced.

In the process of this invention, by using as a coating composition consisting essentially of a mixture of (A)

one or more polymers selected from the group comprising of polymers and copolymers of vinylidene chloride, vinyl chloride copolymers, vinyl acetate copolymers and ethylene-vinyl acetate copolymers and (B) 1–10% by weight, and preferably 3–7% by weight, of a chlorinated or chlorosulfonated polyolefin, an extremely good adhesive property is obtained between the surface of the polyolefinic film base and the coating composition and the bonding strength of the thus formed coating is the same as or better than that obtained by carrying out the above-mentioned usual pretreatment steps.

The coating polymer composition used in this invention may be prepared by mixing the above two components (A) and (B) and applying them in the same manner as is conventional, that is, in the form of an emulsion, a solvent solution or a hot melt. Further, as the coating procedure in this invention may be used in situ, the common coating systems, such as an immersion system, various roll coater systems, spraying system and a ring-type cooling system can be used as the apparatus for producing polyolefinic tubular films.

In addition, since a polyolefin film is easily charged with static electricity by rubbing during the treatment of it, it is desirable to provide a static electricity discharging means to prevent accidents when an organic solvent solution is used or to use, if possible, a noncombustible solvent. If the use of a combustible solvent is necessary, care should be taken that the treatment is conducted below the explosion limit of the solvent vapor or the coating treatment should be conducted in a nitrogen atmosphere.

Moreover, in the process of this invention, it is also effective to apply an antistatic treatment to the film base by subjecting the film base to a common pretreatment, such as irradiation by gamma-rays, exposure to ultraviolet light, corona discharge or a flame treatment.

As the vinylidene chloride polymer in the coating polymer composition used in this invention, there can be used polymers of vinylidene chloride alone, vinylidene chloride-vinyl chloride copolymers (80–97%:3–20%), vinylidene chloride-acrylonitrile copolymers (80–97%:3–20%), vinylidene chloride-methyl acrylate copolymers (80–97%:3–20%), and mixtures thereof. As the vinyl chloride polymer, there can be used copolymers of vinyl chloride, vinyl acetate and maleic anhydride (50–70%: 30–40%:0–10%) and the like and as the ethylene copolymer, there can be used ethylene-vinyl acetate copolymers (60–72%:28–40%) and the like. Further, as the vinyl acetate copolymer there can be used vinyl acetate-crotonic acid copolymers (90–97%:3–10%) and the like.

Further, a suitable example of the chlorinated or chlorosulfonated polyolefin is chlorinated or chlorosulfonated polyethylene, polypropylene, or ethylene-propylene copolymer (50–90%:10–50%) having a chlorine content for chlorination of 20–60% or chlorine and sulfur contents for chlorosulfonation of 5–37% and 0.4–3.0% respectively.

As the crystal structure of chlorinated and chlorosulfonated polyolefins, there are generally an amorphous structure and a crystalline structure, but it is desirable to use a chlorinated or chlorosulfonated polyolefin having a crystalline structure in this invention. If the polymer having an amorphous structure is used, the bonding strength of it with a film base is inferior. As shown in the below-described examples, it was found that the adhesive strength of the coating is influenced by the chlorination degree or the chlorosulfonation degree of the polyolefin. Accordingly, we have studied the compatibility and the adhesive property of coating polymer compositions and as a result have found that chlorinated polyolefins having chlorine content of 30–55%, for example, a chlorinated polyethylene having a chlorine content of 40–55%, preferably 45–50%, a chlorinated polypropylene having a chlorine content of 30–45%, preferably 35–40%, and an ethylene-propylene copolymer having a chlorine content of 35–50%, preferably 40–45%, are suitable. Further, chlorosulfonated polyolefins having a chlorine content of 10–25% and a sulfur content of 1.0–2.5% are suitable. For example, a chlorosulfonated polyethylene having a chlorine content of 15–25% and a sulfur content of 1.5–2.5%, and a chlorosulfonated polypropylene having a chlorine content of 10–20% and sulfur content of 1.0–2.0% are excellent in their coating abilities. In addition, the coating composition according to this invention may include the usual additives, such as an antioxidant, dyes or pigments, a lubricating oil and waxes, an antiblocking agent, or an ultraviolet stabilizer.

The film base used in this invention may be non-oriented or oriented to one direction or orientated in both directions during the film processing. In the case where the film base is oriented to both directions, the orientation degrees may be in a balanced state or in an unbalanced state.

In the case where the film base is oriented, the film base may, in some instances, shrink at the temperatures used for drying the coating polymer composition and, hence, it is desirable in such a case to use a device for preventing such shrinking of the film.

The thickness of coating formed on the film base may be varied in the range of 1–20 microns according to the thickness of the film base and the desired properties of the coating. The coating polymer composition according to this invention may further be added with waxes, acrylic acid, propionic acid, diethylaminoethyl acrylate, etc.

In the examples set forth hereinbelow, the measurement of the adhesive property of the thus-formed coating to the film base was made by a test method similar to a so-called "Scotch" tape test, that is by applying under a pressure of 2 kg./sq. cm. a pressure-sensitive tape of 20 x 200 sq. mm. on the coated film, peeling said pressure-sensitive tape rapidly, and detecting the stripped state of the coating.

The test for the heat-sealing property was conducted by means of a bar-type heat sealer under the conditions of 120° C., 2 kg./sq. cm. of pressure and 2 sec. dwell time of the sealing bar.

The strength of the heat seal was measured by stripping a sealed portion of a film sealed in a so-called fin-seal type by using a small scale Schopper's tension-test machine.

The test for printability was conducted, after printing the products with some inks that are commercially available for use on MST cellophane, by a "Scotch" tape peeling test for detecting the adhesiveness of the ink.

The test for steam permeability was conducted as in JIS Z–0208. The oxygen gas permeability was tested by introducing oxygen in one section of a cell isolated by the film to be tested and then measuring the partial pressure of oxygen which permeated into the opposite section of the cell through the film.

The transparency was measured by using a photoelectric colorimeter.

The examples of this invention are as follows:

EXAMPLE 1

A solvent solution of the coating composition comprising the following components (Composition No. 1) was applied by an immersion method on opposite sides of a nonsurface-treated and nonoriented crystalline isotactic polypropylene film of 25 microns in thickness and the amount of coating used was 4.7 g./sq. m.

Composition No. 1

| | Parts by weight |
|---|---|
| Trichloroethylene | 84.5 |
| Chlorinated polypropylene (Cl content 35%) | 1.0 |
| Vinylidene chloride-vinyl chloride copolymer (The Dow Chemical Co. QX2168: trade name) | 14.0 |
| Lubricant and antiblocking agent | 0.5 |

After coating, the film was dried in a drying furnace at 90° C. to give a transparent and bright film of 28 microns in thickness.

For comparison purposes, similar films were treated with various pretreatments and various coating treatments as detailed in the following table as thus obtained, the films were measured for heat-sealing property, the adhesive power of the coating, printability, and the steam permeability, the results of which are shown in the following table.

EXAMPLE 3

An emulsion of a composition having the following components (Composition No. 3) was applied by means of a gravure coater on one side of a nonsurface-treated, nonoriented crystalline isotactic polypropylene film of 25 microns in thickness and the amount of the coating used was 3 g./m.$^2$.

| | | | | | | Permeability | |
|---|---|---|---|---|---|---|---|
| Pretreatment | Top coat treatment | Transparency, percent | Heat seal strength, g./25 mm. | Adhesiveness of coating Scotch tape test | Printability | Steam permeability, g./m.$^2$/ 24 hr. | Oxygen permeability, cc./m.$^2$/ 24 hr. |
| Sample No.: | | | | | | | |
| 1 None | None | 95.0 | 83 | | No good | 14 | 1,800 |
| 2 do | Composition No. 1 | 95.5 | 374 | Very good | Very good | 3 | 6 |
| 3 Corona-discharging | do | 95 | 392 | do | do | 3 | 6 |
| 4 Potassium bichromate/conc. sulfuric acid/water. | do | 94.8 | 386 | do | do | 3 | |
| 5 None | Composition No. 1 minus chlorinated polypropylene. | 95.1 | 96 | No good | No good | 11 | |
| 6 do | Composition No. 1 using chlorinated polypropylene (Cl content 28%). | 95.5 | 276 | Very good | Very good | | |
| 7 do | Composition No. 1 using chlorinated polypropylene (Cl content 48%). | 95.5 | 163 | do | do | | |

EXAMPLE 2

A solvent solution of a coating composition having the following components (Composition No. 2) was applied by an immersion method on the opposite sides of a non-surface-treated and oriented crystalline isotactic polypropylene film of 18 microns thickness and the amount of the coating was 4.7 g./sq. m.

Composition No. 2

| | Parts by weight |
|---|---|
| Toluene-methyl ethyl ketone | 84.5 |
| Chlorinated polypropylene (Cl content 45%) | 1.0 |
| Vinyl chloride-acrylonitrile copolymer (The Dow Chemical Co. F242L: trade name) | 14.0 |
| Lubricant and antiblocking agent | 0.5 |

Composition No. 3

| | Parts by weight |
|---|---|
| Toluene | 40.0 |
| Water | 40.0 |
| Chlorinated polypropylene (Cl content 35%) | 0.5 |
| Vinylidene chloride - methyl acrylate copolymer resin | 14.0 |
| Nonionic surface active agent | 5.5 |

After coating, the film was dried in a drying furnace at 80° C. to give a transparent and bright film of 27 microns in thickness. For comparison purposes, similar films were treated with various pretreatments and various coating treatments as detailed in the following table.

The transparency, heat seal strength, and adhesiveness of the coating on the thus obtained film are as follows:

| | | Transparency, percent | Heat seal strength (coated surfaces contacted) g./25 mm. | Adhesiveness of coating Scotch tape test |
|---|---|---|---|---|
| Pretreatment | Top coat treatment | | | |
| Sample No.: | | | | |
| 1 None | None | 95.0 | 83 | |
| 2 do | Composition No. 3 | 95.1 | 253 | Very good |
| 13 Corona discharging | do | 95.0 | 265 | Do. |
| 14 None | Compn. No. 3 minus chlorinated polypropylene. | 95.2 | 102 | No good. |

After coating, the film was dried in a drying furnace at 70° C. to give a transparent bright film of 21 microns in thickness. For comparison purposes, similar films were treated with various pretreatments and various coating treatments as detailed in the following table.

The thus obtained films were measured for heat sealing strength and adhesiveness of coating, the results being as follows:

EXAMPLE 4

A solvent solution of a composition having the following components (Composition No. 4) was applied by spraying on one side of a nonsurface-treated nonoriented low-density polyethylene film of 25 microns in thickness and the amount of the coating used was 3 g./sq. m.

| Test No. | Pretreatment | Top coat treatment | Permeability, percent | Heat seal strength, g./25 mm. | Adhesiveness of coating Scotch tape test | Steam permeability, g./sq. m. 24 hrs. |
|---|---|---|---|---|---|---|
| 8 | None | None | 95.6 | 63 | | 6 |
| 9 | do | Composition No. 2 | 95.5 | 236 | Very good | 3 |
| 10 | Corona discharging | do | 5.3 | 246 | do | 3 |
| 11 | None | Compn. No. 2 minus chlorinated polypropylene. | 95.0 | 93 | No good | 3 |

Composition No. 4

| | Parts by weight |
|---|---|
| Trichloroethylene | 84.5 |
| Chlorinated polyethylene (Cl content 48%) | 1.0 |
| Vinylidene - acrylonitrile copolymer (The Dow Chemical Co. F242L: trade name) | 14.0 |
| Lubricant and antiblocking agent | 0.5 |

After coating, the film was dried in a drying furnace to give a transparent and bright film of 27 microns in thickness. The properties of the thus obtained film are as follows:

| Sample No. | Pretreatment | Top coat treatment | Transparency, percent | Heat seal strength, g./25 mm. | Adhesiveness of coating Scotch tape test |
|---|---|---|---|---|---|
| 15 | None | None | 95.1 | 800 | |
| 16 | do | Compn. No. 4 | 95.3 | 273 | Very good. |
| 17 | Corona discharging | do | 95.1 | 286 | Do. |
| 18 | None | Compn. No. 4 minus chlorinated polyethylene. | 94.9 | 106 | No good. |

EXAMPLE 5

A solvent solution of a composition having the following components (Composition No. 5) was applied by an immersion method on the opposite sides of a nonsurface-treated oriented crystalline polypropylene film of 18 microns in thickness.

Composition No. 5

| | Parts by weight |
|---|---|
| Trichloroethylene | 84.5 |
| Chlorosulfonated polypropylene (Cl content 20%, S content 2.0%) | 1.0 |
| Vinyl chloride-vinyl acetate-maleic anhydride copolymer (65:30:5%) | 14.0 |
| Lubricant and antiblocking agent | 0.5 |

After coating, the film was dried in a drying furnace at 90° C. to give a transparent and bright film of 19.5 microns in thickness. The properties of the thus obtained film are as follows:

| Sample No. | Pretreatment | Top coat treatment | Transparency, percent | Heat seal strength, g./25 mm. | Adhesiveness of coating Scotch tape test |
|---|---|---|---|---|---|
| 8 | None | None | 95.6 | 63 | |
| 19 | do | Compn. No. 5 | 95.3 | 226 | Very good. |
| 20 | Corona discharging | do | 95.3 | 240 | Do. |
| 21 | do | Compn. No. 5 minus chlorosulfonated polypropylene. | 95.0 | 95 | Good. |

EXAMPLE 6

A hot melt liquid of a composition having the following components (Composition No. 6) was applied by using a kiss-roll coater on one side of a nonsurface-treated nonoriented crystalline polypropylene film of 25 microns in thickness and the amount of the coating was 5 g./sq. m.

Composition No. 6

| | Parts by weight |
|---|---|
| Ethylene-vinyl acetate copolymer (67:33) (Du Pont Elvax 150: trade name) | 94.5 |
| Chlorinated polyethylene (Cl content 35%) | 5 |
| Lubricant and antiblocking agent | 0.5 |

The properties of the thus obtained film are as follows:

| | Pretreatment | Top coat treatment | Heat seal strength, g./25 mm. | Adhesiveness of coating Scotch tape test |
|---|---|---|---|---|
| Sample No.: | | | | |
| 1 | None | None | 83 | |
| 22 | do | Compn. No. 6 | 284 | Very good. |
| 23 | Corona discharging | Compn. No. 6 minus chlorinated polyethylene. | 290 | Do. |

EXAMPLE 7

A solvent solution of a composition having the following components (Composition No. 7) was applied by an immersion method on the opposite sides of a nonsurface-treated oriented crystalline polypropylene film of 18 microns in thickness and the amount of the coating used was 3 g./sq. m.

Composition No. 7

| | Parts by weight |
|---|---|
| Trichloroethylene | 84.5 |
| Chlorosulfonated polypropylene (Cl content 25%: S content 1.5%) | 1.0 |
| Vinyl acetate-crotonic acid (95:5%) copolymer | 14.0 |
| Lubricant and antiblocking agent | 0.5 |

After coating, the film was dried in a drying furnace at 95° C. to give a transparent and bright film of 20 microns in thickness.

The properties of thus obtained film are as follows:

| Sample No.: | Pretreatment | Top coat treatment | Heat seal strength, g./25 mm. | Adhesiveness of coating Scotch tape test |
|---|---|---|---|---|
| 8 | None | None | 63 | |
| 24 | do | Compn. No. 7 | 212 | Very good. |
| 25 | Corona discharging | do | 223 | Do. |
| 26 | do | Compn. No. 7 minus chlorosulfonated polypropylene. | 101 | No good. |

The embodiments of the invention in which an exclusive property or privilege is claimed are defined as follows:

1. A process for the production of a heat-sealable, gas and water-vapor impermeable polyolefinic film which comprises applying directly onto at least one surface of a polyolefinic film a coating composition consisting essentially of (A) at least one polymer from polymers and copolymers of vinylidene chloride, vinyl chloride copolymers, vinyl acetate copolymers, ethylene-vinyl acetate copolymers or mixtures thereof and (B) 1–10% by weight, based on the weight of the coating composition, of a polyolefin selected from the group consisting of (1) a chlorinated polyolefin containing about 30–55% chlorine and (2) a chlorosulfonated polyolefin containing about 10–25% chlorine and about 1.0–2.5% sulfur, said polyolefin having a crystalline structure, the thickness of the coating on the film being in the range of about 1–20 microns.

2. A process according to claim 1, in which the content of the polyolefin in the coating composition is about 3–7% by weight, based on the weight of the coating composition.

References Cited

UNITED STATES PATENTS

| | | | |
|---|---|---|---|
| 2,925,354 | 2/1960 | Berardinelli et al. | 117—138.8 X |
| 2,956,980 | 10/1960 | Law | 260—897 X |
| 2,961,342 | 11/1960 | Snyder | 117—161 X |
| 3,076,781 | 2/1963 | Frey | 260—897 X |
| 3,149,183 | 9/1964 | Salyer et al. | 260—897 |
| 3,165,560 | 1/1965 | Frey et al. | 260—897 |
| 3,210,307 | 10/1965 | Paoloni | 260—897 X |
| 3,228,791 | 1/1966 | Armour et al. | 117—138.8 |
| 3,236,675 | 2/1966 | Hermitte et al. | 117—138.8 X |
| 3,278,645 | 10/1966 | Paoloni | 260—897 |
| 3,283,035 | 11/1966 | Schnebelen | 260—897 |
| 3,291,862 | 12/1966 | Armour et al. | 260—897 |
| 3,291,863 | 12/1966 | Frey et al. | 260—897 |
| 3,299,182 | 1/1967 | Jennings et al. | 260—897 |

WILLIAM D. MARTIN, Primary Examiner

J. E. MILLER, Assistant Examiner

U.S. Cl. X.R.

117—161; 161—254; 260—897